UNITED STATES PATENT OFFICE.

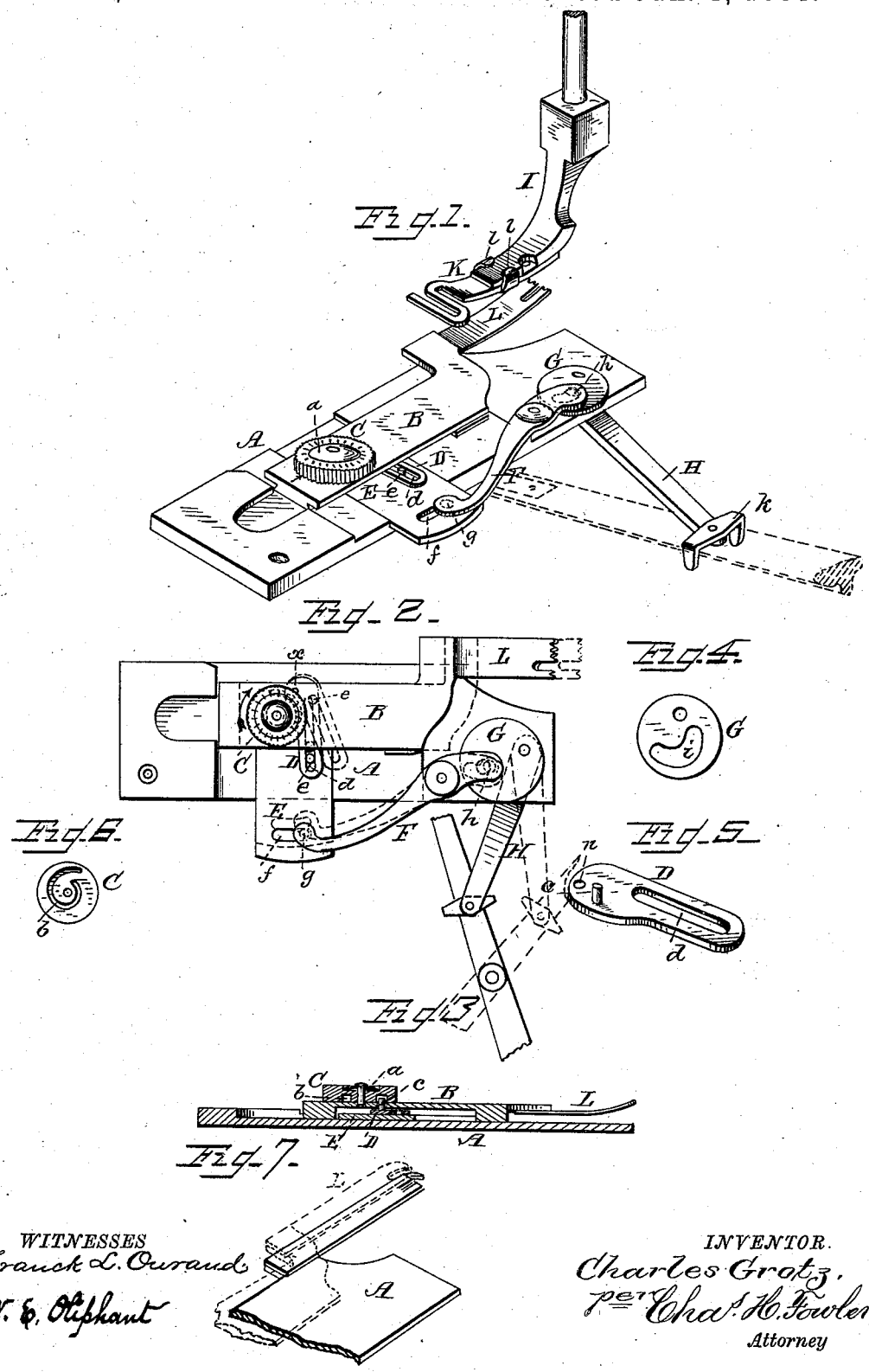

CHARLES GROTZ, OF OSKALOOSA, IOWA, ASSIGNOR TO THE GARRETSON RUFFLER COMPANY, OF SAME PLACE.

RUFFLING ATTACHMENT FOR SEWING-MACHINES.

SPECIFICATION forming part of Letters Patent No. 291,050, dated January 1, 1884.

Application filed January 6, 1883. (No model.)

*To all whom it may concern:*

Be it known that I, CHARLES GROTZ, a citizen of the United States, residing at Oskaloosa, in the county of Mahaska and State of Iowa, have invented certain new and useful Improvements in Ruffling and Shirring Attachments for Sewing-Machines; and I do hereby declare that the following is a full, clear, and exact description of the same, reference being had to the accompanying drawings, in which—

Figure 1 is a perspective view of my invention, showing it in position with relation to the presser-foot of a sewing-machine; Fig. 2, a top plan view thereof; Fig. 3, a longitudinal central section; Fig. 4, a detail view of the eccentrically pivoted and slotted plate; Fig. 5, a similar view of the slotted plate for regulating the fullness of the gather; Fig. 6, an under side plan view, in detail, of the regulating thumb-nut and disk for regulating the fullness of the gather; and Fig. 7 is a detail view of the base-plate, partly in broken section, showing a modification of the ruffler-blade with the addition of a separator blade.

The present invention has relation to certain new and useful improvements in ruffling and shirring attachments for sewing-machines, and refers more particularly to that class in which the ruffler-blade derives its motion through the shuttle or hook driving mechanism of a sewing-machine, the object of the invention being to simplify the operating mechanism of a ruffler and shirring device, whereby a greater range of work and more perfect results are obtained, also ease of operation and less liability of injury to a machine. These objects I attain by the construction substantially as shown in the drawings, and hereinafter described and claimed.

In the accompanying drawings, A represents the base-plate, to which the several operating parts of the device are connected, said plate taking the place of the usual shuttle-race slide of a sewing-machine. The plate A upon its upper side is preferably formed with a dovetail recess near its ends, to receive correspondingly-shaped projections upon the under side of the blade-carrier B at both ends thereof, to steady and guide said carrier in its sliding movement.

A thumb-nut or disk, C, is pivoted to the carrier B, and is kept pressed down against the upper face thereof by a spring-washer, $a$, thus preventing the nut or disk from slipping around by frictional contact with the carrier.

Upon the under side of the nut or disk C an eccentric groove, $b$, is formed, into which extends a pin, $c$, projecting from a slotted rectangular plate, D.

Within the slot $d$ of the plate D works a pin, $e$, extending from the upper side of a transversely-sliding plate, E, fitting and sliding in a recess formed in the base-plate A. This plate E near its outer end has a transverse slot, $f$, in which fits and works a pin, $g$, upon the under side of a curved lever, F, near or at its end, said lever being pivoted to the base-plate A, and having upon its opposite end a pin, $h$, which enters a curved slot, $i$, in a circular or other formed plate, G. The plate G is eccentrically pivoted to the plate A; or, in other words, the pin formed on the plate or attached thereto near its edge and away from its center passes down through a hole in the base-plate, and has rigidly connected to it one end of a suitable arm, H, the opposite end thereof having a pivoted yoke, $k$, or any other suitable means for connecting the arm to the shuttle-lever or other mechanism, (shown in dotted lines, Fig. 1,) for driving the shuttle or hook, as the case may be. By the vibratory motion of the arm H imparted to it through the medium of the shuttle or hook driving mechanism, to which it is suitably connected, the plate G is partially rotated or moved back and forth, and through its connection with the pivoted lever F motion is imparted to the latter, and by means of the pin $g$, working in the slot $f$, the plate E is caused to slide transversely back and forth upon the base-plate A. As the plate E thus moves back and forth the pin $e$ thereon, which enters the slot $d$ in the plate D, will cause the blade-carrier B to move longitudinally back and forth upon the base-plate, carrying the goods to be ruffled beneath the presser-foot I, the slotted plate being pivoted to the under side of the blade-carrier, as shown at $x$, a pin upon said carrier entering a hole, $n$, in the slotted plate shown in Fig. 7. The slotted plate D, being pivoted as described, is retained in place or held stationary with relation to the blade-carrier by means of the pin $c$ on said plate, engaging with groove $b$ in the nut or disk C, (shown in Figs. 3 and 6,) and the slotted plate is set at the required angle with relation to the blade-carrier, as shown in dotted lines, Fig. 2, by turning the disk or nut, thus varying the length of stroke of the carrier.

The guide or gage plate K is constructed with side lips, $l$, for attachment to the presser-foot, as shown in Fig. 1 of the drawings.

The ruffler-blade L, which is of the ordinary construction, may be either curved upwardly, as shown in Fig. 1, or curved downwardly with the addition of a separator blade, as shown in Fig. 7.

No claim is made in this application to a base-plate adapted to be secured in a horizontal position parallel with the cloth-plate and above the path of movement of the shuttle, and provided with a vertical bearing-passage extended through the said plate from its upper to its under side, a short shaft having projecting from its lower end below the said plate and the cloth-plate of the machine an arm, which is extended horizontally backward under the said cloth-plate, to be engaged and vibrated by a shuttle-moving lever, and provided at its upper end with a crank and crank-pin combined with a blade-carrier and blade, and with suitable means to connect the said crank-pin with the blade, whereby the oscillations of the said shaft impart reciprocating motion to the blade-carrier and blade, substantially as described; also, to a plate adapted to serve as a base-plate for the attachment and as a shuttle-covering slide, and provided with a recess at its upper side, combined with the vertical shaft therein, a horizontal arm extended backwardly from the under side of the said plate, and with the crank made as a disk fitted into the said recess, the said crank being provided with a crank-pin by which to impart reciprocating motions to a blade-carrier and blade, with means for operating an arm horizontally extended under the cloth-plate, as these matters are claimed in another application filed by me March 16, 1883, Serial No. 88,423.

Having now fully described my invention, what I claim as new, and desire to secure by Letters Patent, is—

1. In a ruffling and shirring attachment for sewing-machines the combination of a blade-carrier and an arm or lever connected to the shuttle-bar of the machine with an intermediate means for connecting the arm or lever to the blade-carrier consisting, substantially, of a pivoted lever and transversely-sliding plate, substantially as and for the purpose described.

2. The carrier B, having connected thereto a suitable ruffler-blade and a transversely-sliding plate, E, in combination with the pivoted lever F and means for operating it, substantially as and for the purpose specified.

3. The blade-carrier B, having suitably connected thereto the slotted plate E, in combination with the lever F, eccentrically-pivoted plate G, and the arm H, connected thereto, substantially as and for the purpose set forth.

4. The blade-carrier B, having pivoted thereto the slotted plate D, in combination with the nut or disk C, having upon its under side groove $b$, to receive the pin $c$, substantially as and for the purpose set forth.

5. The slotted plate E, in combination with the pivoted lever F, slotted plate G, and arm H, substantially as and for the purpose specified.

6. The carrier B, and nut or disk C, having groove $b$, in combination with the slotted plates D E, substantially as and for the purpose set forth.

7. The carrier B, having pivoted thereto the slotted plate D, carrying pin $c$, in combination with the slotted plate E, nut or disk C, and lever F, substantially as described.

8. In a ruffling and shirring attachment for sewing-machines, the combination, with the pivoted lever F, having at its ends pins $g\ h$, of the slotted transversely-sliding plate E, and means for connecting it to the blade-carrier and the eccentrically-pivoted and slotted plate G, the pins upon the lever entering the slots in the plates, substantially as and for the purpose specified.

9. The carrier B, slotted plate D, and grooved nut or disk C, constructed substantially as shown, in combination with the plate E, lever F, plate G, and arm H, substantially as and for the purpose specified.

10. The longitudinally-sliding plate B, and the slotted transversely-sliding plate E, supported by the base-plate A, in combination with the regulating nut or disk C, slotted plate D, pivoted to the carrier or sliding plate B, the lever F, pivoted to the base-plate, the slotted eccentrically-pivoted plate or disk G, and arm H, substantially as and for the purpose set forth.

In testimony that I claim the above I have hereunto subscribed my name in the presence of two witnesses.

CHARLES GROTZ.

Witnesses:
JOHN F. LACEY,
SETH P. HAWKINS.